(12) United States Patent
Fardig et al.

(10) Patent No.: US 11,868,200 B1
(45) Date of Patent: Jan. 9, 2024

(54) METHOD AND DEVICE FOR REPRODUCING AN ERROR CONDITION

(71) Applicant: LENOVO (SINGAPORE) PTE. LTD, New Tech Park (SG)

(72) Inventors: Matthew Fardig, Boonville, IN (US); Sathish Kumar Ganesan, Tampa, FL (US); Dane Hixson, Eden, UT (US); Anthony Martinez, Fort Wayne, IN (US)

(73) Assignee: LENOVO (SINGAPORE) PTE, LTD., New Tech Park (SG)

( * ) Notice: Subject to any disclaimer, the term of this patent is extended or adjusted under 35 U.S.C. 154(b) by 0 days.

(21) Appl. No.: 17/811,869

(22) Filed: Jul. 11, 2022

(51) Int. Cl.
*G06F 11/00* (2006.01)
*G06F 11/07* (2006.01)

(52) U.S. Cl.
CPC ...... *G06F 11/0769* (2013.01); *G06F 11/0709* (2013.01)

(58) Field of Classification Search
CPC .............. G06F 11/079; G06F 11/2273; G06F 11/3438; G06F 11/3668; H04L 67/01; H04L 67/10; H04L 67/1396; H04L 67/535; H04L 43/02; H04L 43/55
See application file for complete search history.

(56) References Cited

U.S. PATENT DOCUMENTS

| | | | |
|---|---|---|---|
| 6,622,298 B1 * | 9/2003 | Stamm | G06F 11/3684 717/125 |
| 9,009,544 B2 * | 4/2015 | Cook | G06F 11/079 714/48 |
| 9,697,101 B1 * | 7/2017 | Chen | H04L 67/02 |
| 10,963,331 B2 * | 3/2021 | Bangalore | G06F 11/0778 |
| 2010/0229112 A1 * | 9/2010 | Ergan | G06F 11/0769 715/764 |
| 2011/0113287 A1 * | 5/2011 | Gururaj | G06F 11/0706 714/E11.029 |
| 2013/0074051 A1 * | 3/2013 | Freeman | G06F 11/3438 717/130 |

(Continued)

OTHER PUBLICATIONS

Valdes, Olivia Rodriguez, Finding the Shortest Path to Reproduce a Failure Found by TESTAR, ACM, 2019 (Year: 2019).*
Email attachment, Jul. 19, 2021, Wikipedia (Year: 2021).*

*Primary Examiner* — Marc Duncan
(74) *Attorney, Agent, or Firm* — Dean D. Small; The Small Patent Law Group, LLC (57) ABSTRACT

A method that includes identifying a processing error, obtaining user input information for a determined period prior to identifying the processing error, determining steps undertaken during the determined period prior to identifying the processing error based on the input information, and obtaining context awareness information related to the one or more processors. The method also includes obtaining network user input information and network context awareness information related to the processing error from other electronic devices within a network, determining a reduced amount of steps from the steps undertaken during the determined period to identify the processing error to form an error reproduction plan by analyzing the network user input information and the network context awareness information in comparison to the user input information and context awareness information, and communicating the error reproduction plan to a user or third party.

17 Claims, 5 Drawing Sheets

(56) References Cited

U.S. PATENT DOCUMENTS

| | | | |
|---|---|---|---|
| 2019/0286546 A1* | 9/2019 | Johnston | G06F 11/3608 |
| 2021/0142258 A1* | 5/2021 | Noivo | G06F 11/0775 |
| 2021/0311860 A1* | 10/2021 | Botea | G06F 11/3688 |
| 2023/0058452 A1* | 2/2023 | Baek | G06F 11/321 |

* cited by examiner

METHOD AND DEVICE FOR REPRODUCING AN ERROR CONDITION

BACKGROUND

Embodiments herein generally relate to methods and devices for reproducing an error condition in an electronic device.

Electronic devices, such as laptop computers, mobile phones, personal digital assistants (PDAs), iPads, other computing devices, etc. have become part of many individuals' everyday life. Such electronic devices continue to be improved to make the experience of users as enjoyable as possible. During use, such electronic devices communicate with applications within a network, including the cloud, to provide additional functionality to the electronic device.

When a cloud-based application is in use and a processing error occurs, it can often be difficult to determine what caused the error. Log files often fill up with HTTP error codes with no context into why they occurred. Systems can capture stack traces that provide limited visibility into the call stack in the module in which the error occurred. There is no overall context explaining exactly what the user did and in what order they did it, and what else was going on in the system at the time these errors occurred. Developers need reproducible steps in order to solve problems like this and are often left adding extra debugging to the code and hoping the error happens again in order to isolate a problem. Often, problems in applications are handled with a piecemeal approach that only corrects the symptom rather than fixing the root cause, simply because the root cause can never be identified.

Some electronic devices and/or applications compile logs, including providing stack trace information, to give better information related to an error. Still, such logs are still relatively ineffective at reproducing the error. In particular, the stack trace information provides a call stack identifying each function, or step, that was called, or implemented, before the error occurred. However, this is limited to an individual module or microservice and does not provide any steps to reproduce. The logging also relies on foreknowledge of the potential error in order to capture useful data into the context in which the error occurred. In other instances crash detection tools are also utilized. This allows an application to catch unexpected errors and can log the stack trace for that error. Again, this is limited to the module or microservice in which the error occurred, and only provides a call stack, as well as the ability to log how often the error occurred, what browser the user was using, etc. Unfortunately, this still provides little information for a developer to reproduce how the error occurred so that the cause of the processing error can be determined.

SUMMARY

In accordance with embodiments herein, a method is provided where under control of one or more processors configured with executable instructions, the method includes identifying a processing error. The method also includes obtaining user input information for a determined period prior to identifying the processing error, determining steps undertaken during the determined period prior to identifying the processing error based on the input information, and obtaining context awareness information related to the one or more processors. The method also includes obtaining network user input information and network context awareness information related to the processing error from other electronic devices within a network, determining a reduced amount of steps from the steps undertaken during the determined period to identify the processing error to form an error reproduction plan by analyzing the network user input information and the network context awareness information in comparison to the user input information and context awareness information, and communicating the error reproduction plan to a user or third party.

Optionally, the method also includes automatically running the error reproduction plan to verify the processing error occurs, and communicating a result of the error reproduction plan with the error reproduction plan. In one aspect, automatically running the error reproduction plan includes implementing each of the steps remaining after reducing the number of steps. In another aspect, determining the reduced number of steps includes utilizing a machine learning algorithm to compare the user input information to the network user input information to determine common user input information, and utilizing the machine learning algorithm to compare the context awareness information and the network context awareness information to determine common context awareness information. In addition, the error reproduction plan is based on the common user input information and common context awareness information. In one example, the user input information includes at least one of a keystroke, or an input device actuation. In another example, the context awareness information includes at least one of number of users on the network, time the processing error is identified, number of users on the network, operating system information, or number of programs the user is operating.

Optionally, the method also includes continuously monitoring the user input information, and storing the user input information. In one aspect, obtaining network user input information and network context awareness information related to the processing error from other electronic devices within the network includes accessing a storage device related within the network. In another aspect, the method also includes communicating the error reproduction plan to a user includes displaying the error production plan on an output device. In one example, communicating the error reproduction plan to a user includes attaching a file that includes the error reproduction plan to a communication to the user or the third party.

In accordance with embodiments herein, a device is provided that includes a processor, and a memory storing program instructions accessible by the processor. Responsive to execution of the program instructions, the processor identifies a processing error, obtains user input information for a determined period prior to identifying the processing error, and determines steps undertaken during the determined period prior to identifying the processing error based on the input information. The processor also obtains context awareness information related to the one or more processors, obtains network user input information and network context awareness information related to the processing error from other electronic devices within a network, and determines a reduced amount of steps from the steps undertaken during the determined period to identify the processing error to form an error reproduction plan by analyzing the network user input information and the network context awareness information in comparison to the user input information and context awareness information. The processor also communicates the error reproduction plan to a user or third party.

Optionally, the method also includes a sensor configured to obtain the context awareness information in real time. In one aspect, the context awareness information includes identification of an operating system, identification of a number of users on a network in communication with an electronic device that has the processing error, and a time of the processing error. In another aspect, the processor also automatically runs the error reproduction plan to verify the processing error occurs, and communicates a result of the error reproduction plan with the error reproduction plan. In one example, automatically running the error reproduction plan includes implementing each of the steps remaining after reducing the number of steps. In another example, determining the reduced amount of steps includes utilizing a machine learning algorithm to compare the user input information to the network user input information to determine common user input information, and utilizing the machine learning algorithm to compare the context awareness information and the network context awareness information to determine common context awareness information; and wherein the error reproduction plan is based on the common user input information and common context awareness information. In yet another example, the processor also continuously monitoring the user input information, and storing the user input information. In one embodiment, obtaining network user input information and network context awareness information related to the processing error from other electronic devices within the network includes accessing a storage device related within the network.

In accordance with embodiments herein, a computer program product is provided that includes a non-signal computer readable storage medium comprising computer executable code to identify a processing error, and obtain user input information for a determined period prior to identifying the processing error. The computer executable code also determines steps undertaken during the determined period prior to identifying the processing error based on the input information, and obtains context awareness information related to the one or more processors. The computer executable code also obtains network user input information and network context awareness information related to the processing error from other electronic devices within a network, determines a reduced amount of steps from the steps undertaken during the determined period to identify the processing error to form an error reproduction plan by analyzing the network user input information and the network context awareness information in comparison to the user input information and context awareness information, and communicates the error reproduction plan to a user or third party. Optionally, the executable code also automatically runs the error reproduction plan to verify the processing error occurs, and communicating a result of the error reproduction plan with the error reproduction plan.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "processing error" as used herein shall mean any and all incorrect states, malfunctions, etc. where an application, program, function, action, etc. does not operate as intended. As an example, if a web communication application has a share screen function and when actuated only select individuals participating in a web call can see the screen of the person sharing, a processing error has occurred.

The term "user input information" as used herein shall mean any and all keystrokes, clicks, entries, key actuations, etc. performed by a user. The user may be the user of the electronic device, or a user of another electronic device (e.g. network user input information). For example, using a mouse, mouse pad, touch screen, etc. to click or actuate a tab or link is user input information. In another example, inserting text in a text box or login box is user input information. In yet another example, providing a voice command through a microphone or other audio device is user input information.

The term "error reproduction plan" as used herein shall mean any and all steps, suggestions, comments, directions, instructions, etc. related to a processing error utilized to identify or reproduce a processing error, and/or provide a solution for the processing error. The error reproduction plan can include steps to undertake to reproduce an error, and/or context awareness information existing related to the processing error.

The term "real time" as used herein shall mean at the same time, or a time substantially contemporaneous, with an occurrence of another event or action. For the avoidance of doubt, as an example, when an error reproduction plan is requested by a user, or automatically formed, and provided in real-time, the error reproduction plan is provided within a few seconds of the request or detection of the processing error.

The term "context awareness information" refers to information indicative of a condition present in an electronic device, network, or environment in which one or more electronic devices are located. Nonlimiting examples of context awareness information include number of users on the network, time the processing error is identified, number of users on the network, operating system information, number of programs the user is operating, room temperature, user characteristics, or the like. Context awareness information can be related to an electronic device, or another electronic device (e.g. network context awareness information). The context awareness information can be obtained from sensors of an electronic device, sensors of an auxiliary electronic device that is communicated to an electronic device, a storage device of an electronic device or auxiliary electronic device, a determination made from information communicated from an auxiliary electronic device to an electronic device, a determination made from data detected by an electronic device or auxiliary electronic device, data detected by an electronic device or auxiliary electronic device, or the like. The context awareness information can include the number of individuals in an environment, motion data, information and data related to events such as sporting events, concerts, plays, or the like, being observed by an individual, etc., noise level, location data or information, or the like.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the primary electronic device and a secondary electronic device, and/or iii) receiving the data, signals, information, etc. at a remote server over a network connection. The obtaining operation, when from the perspective of a primary electronic device, may include sensing new signals in real time, and/or accessing memory to read stored data, signals, information, etc. from memory within the primary electronic device. The obtaining operation, when from the perspective of a secondary electronic device, includes receiving the data, signals, information, etc. at a transceiver of the secondary electronic device where the data, signals, information, etc. are transmitted from a primary electronic device and/or a remote server. The obtaining operation may be from the perspective of a remote server, such as when receiving the data, signals, information, etc. at a network interface from a local external device and/or directly from a primary electronic device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided for automatically forming an error reproduction plan, that in one example is an end to end test that demonstrates exactly how to reproduce an error state in an application. In one example, machine learning is utilized to analyze multiple occurrences of an error, and is able to create the error reproduction plan, including a list of steps that takes the shortest path through an application to reproduce a processing error. The error reproduction plan also takes into account the state of the application in order to provide key information about factors in the system that must be present in order for the error to manifest (certain system load, certain browser being used, certain time of day, etc.). To accomplish, a repair application tracks the user input information while utilizing an application producing the processing error so that reproducible steps can be provided. In addition, when the error occurs, the repair application creates a map of the user input information from the time the user accessed the application until the error occurred. This map is then used to produce the error reproduction plan that includes a list of steps that can be run manually to reproduce a processing error. The repair application also obtains context awareness information about the state of the application and network at the time of the processing error. For example, the context awareness information can include the browser and/or operating system utilized, the system load was at the time of the processing error, how many users were connected to the system, etc. The repair application then obtains similar information related to each time the processing error has occurred in the network and compares those processing error to a current error. By utilizing machine learning, an error reproduction plan can be formed that includes the least number of steps or processes to reproduce the error.

Figure 1:
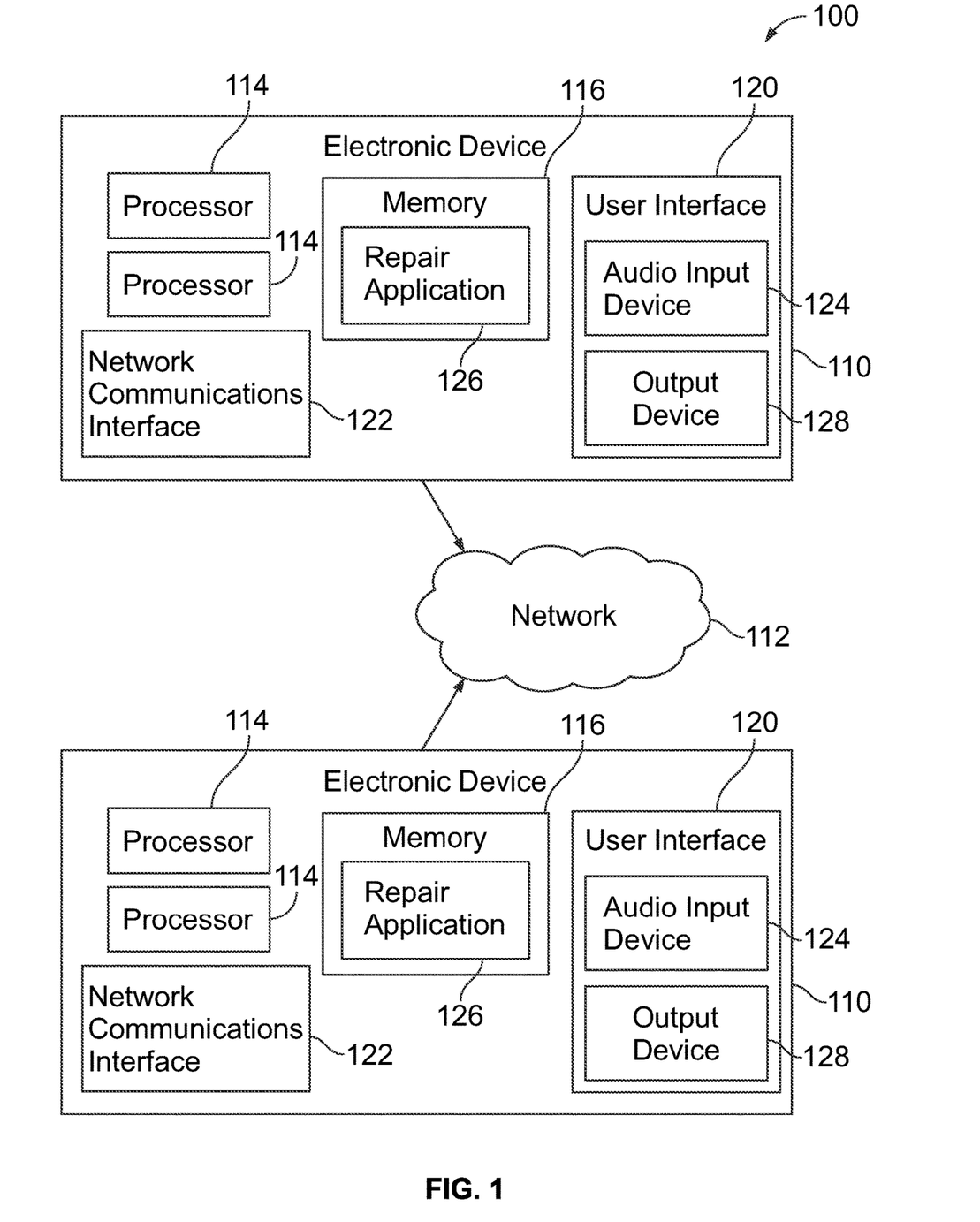
FIG. 1 illustrates a schematic front view of an electronic device in accordance with embodiments herein.

FIG. 1 illustrates a system 100 that includes one or more electronic devices 110 that communicate with one another over a network 112. Optionally, the electronic devices 110 may communicate through a wholly or partially wired subsystem. The network 112 may represent the World Wide Web, a local area network, a wide area network (WAN) and the like. The electronic devices 110 may represent various types of electronic devices including, but not limited to, smart phones, desktop or laptop computers, tablet devices, smart TVs, fixed cameras, portable or handheld cameras, recording devices, digital personal assistant (DPA) devices and the like.

In one example, the electronic devices 110 may all be located within a similar environment. As an example, all of the electronic devices may be in an office building, school, shopping mall, store, coffee shop, home, apartment building, hotel, motel, stadium, event center, or the like. In this manner, the network 112 can be associated with the environment and include applications related to the environment. For example, an office building may include a network that includes a security application that is utilized for accessing information from an electronic device 110 that communicates via the network 112. To this end, information, including user information, electronic device information, user input information, context awareness information, or the like may be stored in a storage device, in a cloud of the network, etc., so that such information can be accessed by each electronic device 110 communicating with the network, or in the environment.

At least one of the electronic devices 110 may be configured to implement error detection and correction in accordance with embodiments herein. To this end, the at least one electronic device 110 can access the network, cloud, storage device, etc. to obtain network user input information and network context awareness information that is related to other users of the network, or an application, in order make determinations related to processing error of the electronic device.

The electronic device 110 may include one or more processors 114, memory 116, a user interface 120, a network communications interface 122, and various other mechanical components, electrical circuits, hardware and software to support operation of the electronic device 110. It is recognized that not all electronic devices 110 include a display, user interface, and the like. For example, music playing device may only include a microphone and speaker without a display.

The memory 116 can encompass one or more memory devices of any of a variety of forms (e.g., read only memory, random access memory, static random access memory, dynamic random access memory, etc.) and can be used by the processor 114 to store and retrieve data. The data that is stored by the memory 116 can include, but need not be limited to, operating systems, applications, user information, and other information. Each operating system includes executable code that can be stored in the memory that controls basic functions of the electronic device, such as interaction among the various components, communication with external devices via a wireless transceivers and/or component interface, and storage and retrieval of applications and data to and from the memory 116. Each application includes executable code that utilizes an operating system to provide more specific functionality for the electronic device.

The user interface 120 may include a variety of visual, audio, and/or mechanical devices. For example, the user interface 120 can include a visual input device such as an optical sensor or camera, and a mechanical input device such as a keyboard, keypad, selection hard and/or soft buttons, switch, touchpad, touch screen, icons on a touch screen, a touch sensitive areas on a touch sensitive screen and/or any combination thereof. As further examples, the user interface 120 may include a touch sensitive screen, a non-touch sensitive screen, a text-only display, a smart phone display, and/or any combination thereof. The user interface 120 permits the user to select one or more of a switch, button or icon in connection with various operations of the device 110. Similarly, the user interface 120 can include a visual output device such as a liquid crystal display screen, one or more light emitting diode indicators, or the like. The display may be touch sensitive to various types of touch and gestures.

The user interface 120 may also include an audio input device 124 such as a microphone, recorder, or the like that receives sounds waves from the environment. The audio input device 124 may include voice recognition functionality, voice to text functionality or the like.

In one example, the memory 116 may include a repair application 126 configured to identify processing errors and determine the least amount, or number, of steps required to reproduce the processing error, and then form an error reproduction plan that includes those steps. In this manner, the error reproduction plan allows a user, developer, repair person, etc. the ability to reproduce the error in an effort to determine the cause of the processing error. In one example, the repair application 126 can automatically run the formed error reproduction plan to generate a report showing the steps that resulted in the error to verify the error reproduction plan results in the error.

In one example, the repair application 126 continuously monitors and records user input information. The user input information (e.g. click information) includes all inputs provided to the electronic device. These inputs can include keystrokes, pressing an enter key or button, accessing an application, program, webpage, or the like, actuating a function key or button, clicking or actuation a mouse, mouse pad, etc., turning on and off an electronic device, logging in and out of an electronic device, restarting an electronic device, the electronic device entering a screen saver mode from non-use by the user, combinations of keys or buttons being actuated, or the like. Each of these actions can be monitored, recorded, stored in a memory, logged, etc.

In addition, the repair application 126 continuously monitors the electronic device to identify when an error has occurred. The processing error may result in an application closing, a frozen screen, a function such as internet access not working correctly, slow processing times, electronic device shutdown, or the like. Upon such activities, the repair application automatically identifies such an error.

In response to identification of the error, the repair application 126 obtains the user input information for a determined period before the error. In one example, the determined period can be one minute. Alternatively, the determined period can be two minutes, five minutes, ten minutes, or the like. In another example the determined period can be determined by a number of inputs by the user. For example, the repair application may obtain the ten previous inputs, twenty previous inputs, one hundred previous inputs, or the like. In this manner, the amount of time required to obtain those ten, twenty, one hundred, etc. inputs is the determined period. In yet another example, the determined period is determined based on a determined event. As an example, the determined event can be logging into the electronic device 110. In this manner, every user input from the time the user logs into the electronic device until the identification of the error is the user input information obtained during a determined period before the error.

In response to the identification of the error, the repair application 126 also obtains context awareness information at the time of the error. Context awareness information can include the number of users on a network, the number of programs being operated on the electronic device 110, the type, name, or version of the programs being operated on the electronic device 110, the type, name, or version of the application being utilized that results in the error, the time of the error, the user of the electronic device 110, the environment of the electronic device, the location of the electronic device, electronic device 110 characteristics such as temperature, run time, age, or the like, type of network, application settings, electronic device settings, etc. For example, regarding the user of the electronic device, if a determination is made that a child or younger person was operating the electronic device, an indication that different security settings, application settings, etc. are provided. To this end, the context awareness information includes any and all information that can inform an individual attempting to reproduce an error, a characteristic or condition present that may have contributed to the error occurring.

Upon obtaining the user input information and the context awareness information, the repair application 126 can access from a storage device network user input information and network context awareness information. The network user input information and network context awareness information are any and all information related to the identified processing error that has occurred at another electronic device. For example, if an application begins randomly closing during use, the repair application 126 obtains all recorded instances of the application randomly closing during use. This can also include previous times the application randomly closed during use on the electronic device. In addition, the repair application 126 can access a storage device of the electronic device or a storage device in the network to determine all incidents of the application randomly closing on network electronic device. In one example, the repair application 126 receives communications from other electronic devices in the network of each error that has occurred in an application that is on the network. In particular, when an error at another electronic device occurs, the other electronic device automatically communicates the error and accompanying user input information and context awareness information to any electronic device having a repair application for storage of the information in a storage device of the electronic device. Alternatively, a network storage device 128 can be provided that similarly receives communications from other electronic devices regarding processing errors, and the user input information and context awareness information related to each error. To this end, each repair application at each electronic device can classify each error so that a lookup table, decision tree, algorithm, etc. may be utilized in identifying the common processing error when the user input information and network context awareness information is being obtained from the network storage device 128, or alternatively the storage device of the electronic device 110.

In response to obtaining the network user input information and the network context awareness information, the repair application 126 analyzes the user input information and the context awareness information by comparing each to the network user input information and the network context awareness information to determine common actions or characteristics related to the processing error. In one example an artificial intelligence (AI) and/or machine learning (ML) algorithm is utilized to determine the common actions and/or characteristics related to the processing error. By utilizing an AI or ML algorithm, numerous processing errors from electronic devices all over the network can be quickly obtained, analyzed, and an error reproduction plan can be formed for an individual attempting to identify the underlying cause of the processing error in real time. Such analysis could not be undertaken by a human, far less in a timely manner such that the processing error can be nearly instantly reproduced for an individual attempting to determine the underlying cause of a processing error.

The error reproduction plan is formed by reviewing the steps, or inputs, provided by the user leading up to the processing error during the determined period, and then eliminating inputs, or steps, that are not needed to reproduce the error by analyzing the network user input information and the network context awareness information. In particular, only common steps and common context awareness information are utilized in forming the error reproduction plan to provide the shortest path to reproducing the error. By providing the shortest path, irrelevant information is eliminated, pinpointing the exact inputs responsible for the error, facilitating error diagnosis and remedies.

Once the repair application 126 analyzes the user input information and context awareness information to form the error reproduction plan, the repair application 126 may automatically run the error reproduction plan to cause the error. In particular, the repair application automatically provides the user input responsible for causing the processing error to verify the error reproduction plan causes the error. The results of the error reproduction plan are stored in a storage device. In addition, the repair application 126 communicates the error reproduction plan, along with the results of running the error reproduction plan to an individual responsible for repairing the processing error. The communication may be displaying the error reproduction plan on an output device such as a display or screen. Alternatively, the communication may be an electronic mail, text, etc. that includes an attached file that includes the error reproduction plan, and the results of running the error reproduction plan to generate the error. To this end, the communication may alert a person responsible for repair of the processing error, identity of the processing error, identity of the owner of the electronic device, identity of the electronic device, etc., while an attachment includes the error reproduction plan and results of running the error reproduction plan. As a result, the person responsible for solving the underlying problem immediately has the error reproduced for analysis, significantly reducing repair time, and enhancing solutions that fix the actual underlying problem.

Figure 2:
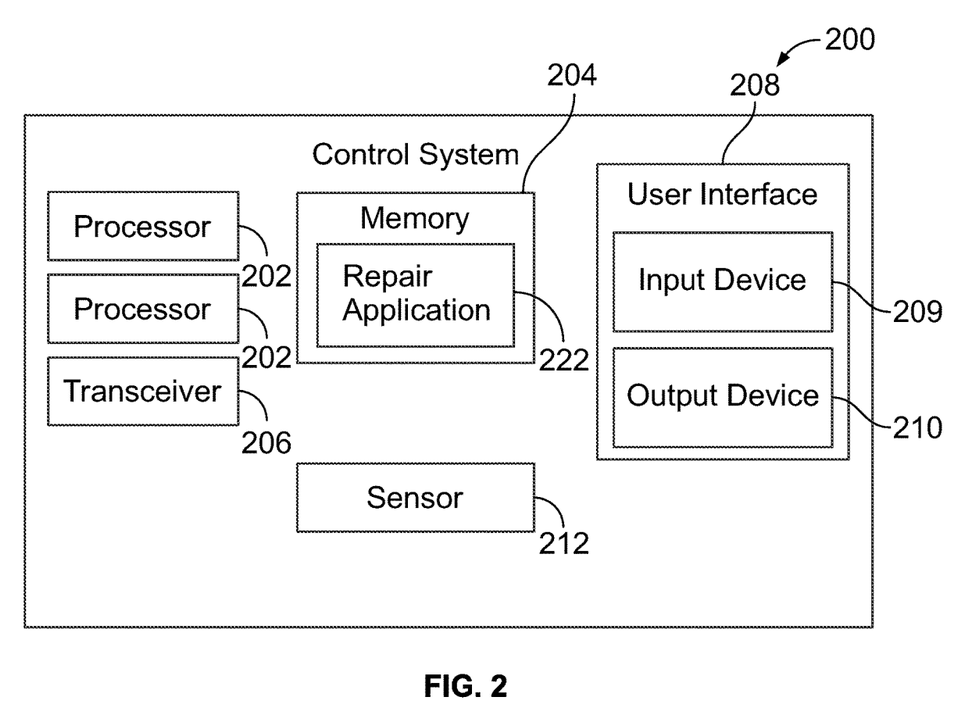
FIG. 2 illustrates a schematic view of an electronic device in accordance with embodiments herein.

FIG. 2 illustrates a simplified block diagram of a control system 200 configured to generate an error reproduction plan for determining the cause of a processing error of the electronic device 200. The electronic device 200 includes components such as one or more transceivers 206, one or more processors 202 (e.g., a microprocessor, microcomputer, application-specific integrated circuit, etc.), and one or more local storage medium (also referred to as a memory portion) 204.

Each transceiver 206 can utilize a known wireless technology for communication. The one or more processors 202 obtain context awareness information from the electronic device, or auxiliary electronic devices, and produce an error reproduction plan that can be utilized by an individual attempting to identify the underlying problem associated with a processing error to reproduce how the error resulted.

The local storage medium 204 can encompass one or more memory devices of any of a variety of forms (e.g., read only memory, random access memory, static random access memory, dynamic random access memory, etc.) and can be used by the one or more processors 202 to store and retrieve data. The data that is stored by the local storage medium 204 can include, but need not be limited to, context awareness information, user input information, application information, operating system information, obtained data, informational data, user characteristics data, environmental characteristic data, etc. As used herein data and information can be utilized interchangeably. Each application and operating system includes executable code that controls basic functions of the electronic device 200, such as interaction among the various components, communication with external devices via the transceivers 206, and storage and retrieval of applications, context data, etc. to and from the local storage medium 204.

The electronic device 200 in one embodiment also includes a user interface 208 that is configured to communicate with a network resource. The user interface 208 can include one or more input devices 209 and one or more output devices 210. The input and output devices 209, 210 may each include a variety of visual, audio, and/or mechanical devices. For example, the input devices 209 can include a visual input device such as an optical sensor or camera, an audio input device such as a microphone, and a mechanical input device such as a keyboard, keypad, selection hard and/or soft buttons, switch, touchpad, touch screen, touch screen keyboard, icons on a touch screen, a touch sensitive areas on a touch sensitive screen and/or any combination thereof. The screen may be touch sensitive to various types of touch and gestures. In one example, the input device 209 may be a keyboard, mouse, mouse pad, touch screen, or the like.

The electronic device 200 may also include one or more electronic device sensors 212 that can obtain context awareness information that can include network characteristics, electronic device characteristics, user characteristics, environmental characteristics, or the like. The one or more electronic device sensors may include a microphone, camera, thermometer, heart monitor, infrared, haptic sensor, user input sensor, or the like that may obtain context awareness information related to one of or both the user and/or the environment of the electronic device 200.

The electronic device 200 may also include a repair application 222. In one example, the repair application 222 includes instructions to form an error reproduction plan based on user input information and context awareness information related to a processing error. In one example the repair application 222 is the repair application of FIG. 1. In particular, the repair application 222 can be part of the control system 200 of the electronic device itself and communicate via the transceivers 206 to obtain network user input information and network context awareness information, or alternatively can be in a cloud or part of a network device that communicates with numerous electronic devices. Regardless of the location of the repair application 222, the repair application 222 is able to identify a processing error at an electronic device and in response obtain user input information and context awareness information for a determined period. The repair application 222 can then obtain network user input information and network context awareness information related to the processing error to and analyze the information to form an error reproduction plan. The error reproduction plan includes a reduced number of steps or inputs as compared to the number of steps or inputs obtained from the determined period before identification of the error. By analyzing and comparing the user input information and context awareness information with the network user input information and network context awareness information, steps, or inputs for reproducing the error can be eliminated. As a result, the shortest (e.g. least number of steps) path to reproduce the error is determined. The repair application 222 can also implement the error reproduction plan, and create a report showing the processing responses and processing error resulting from the error reproduction plan. The error reproduction plan and report can then be communicated to a person responsible for fixing the processing error in an attachment, file, document, or the like.

Figure 3A:
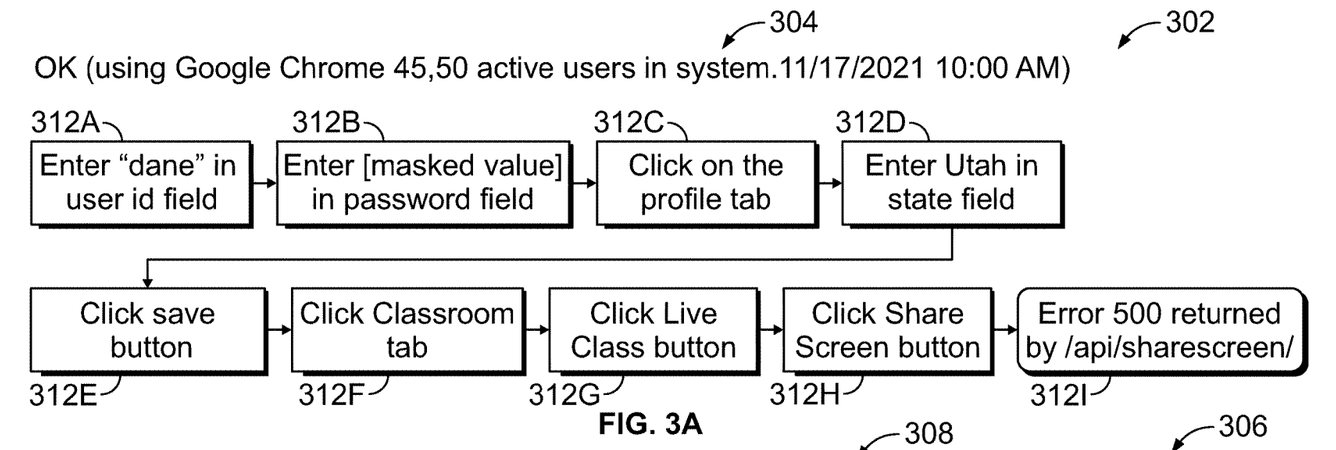
FIG. 3A illustrates a block flow diagram of user input information and context awareness information in accordance with embodiments herein.
Figure 3B:
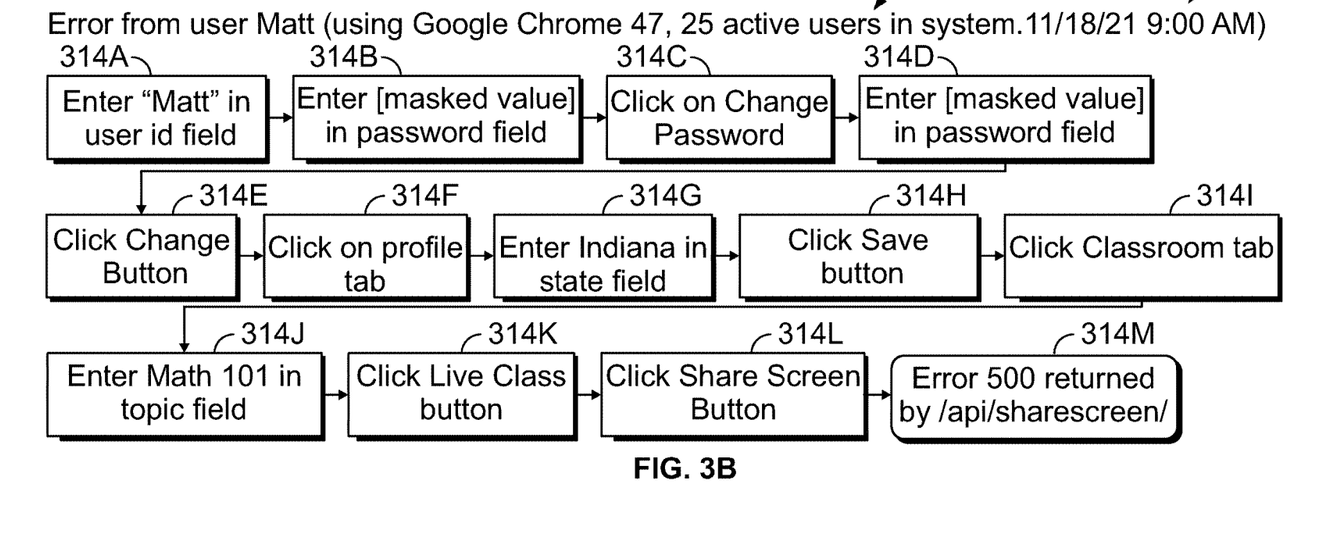
FIG. 3B illustrates a block flow diagram of user input information and context awareness information in accordance with embodiments herein.
Figure 3C:
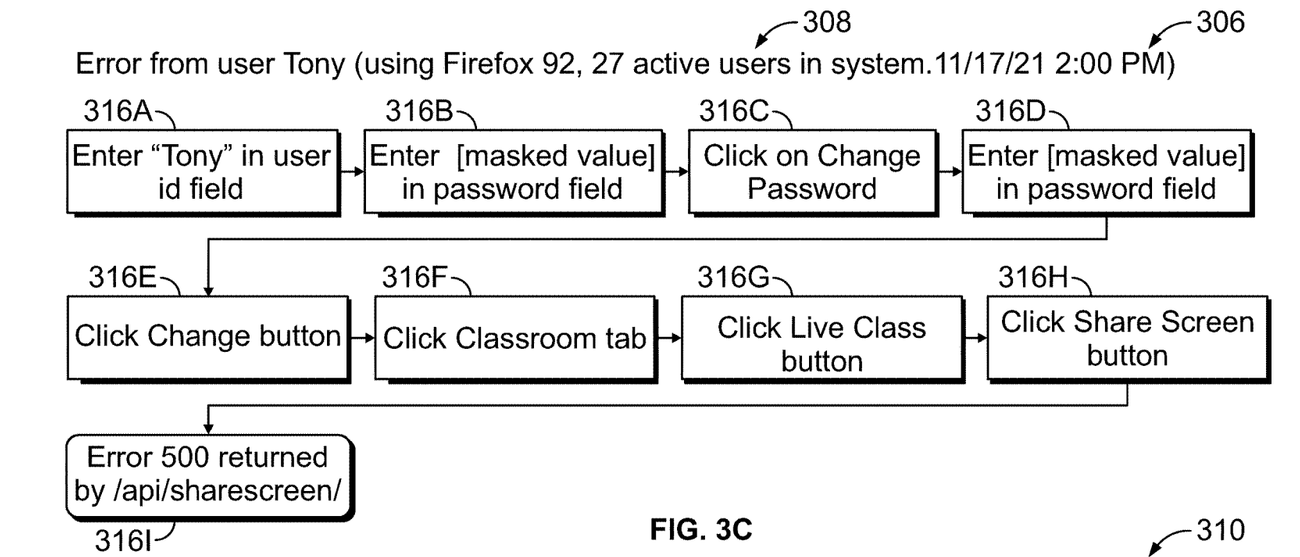
FIG. 3C illustrates a block flow diagram of user input information and context awareness information in accordance with embodiments herein.
Figure 3D:
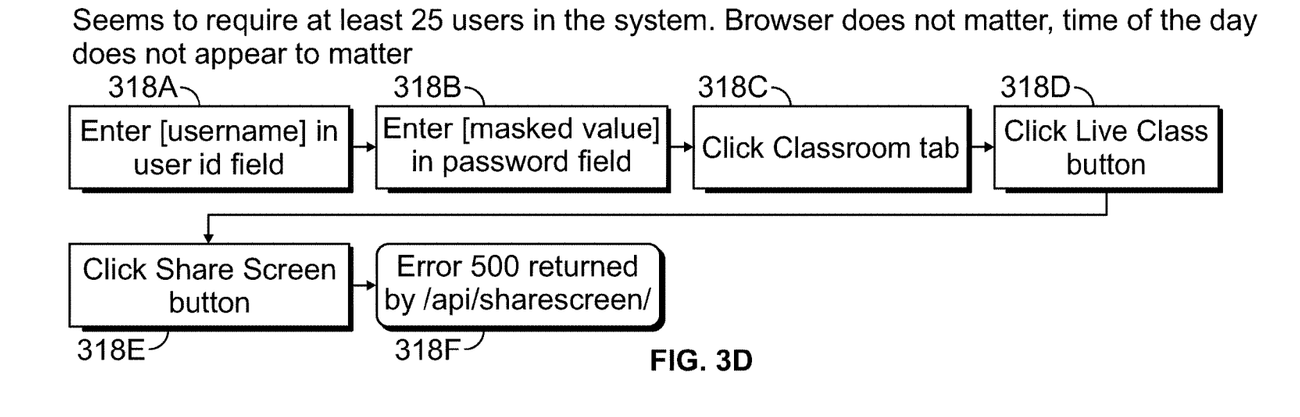
FIG. 3D illustrates a block flow diagram of user input information and context awareness information in accordance with embodiments herein.

FIGS. 3A-3D show simplified block flow diagrams of user input information and context awareness information, to illustrate how network input information and network context awareness information can be utilized to form an error reproduction plan. In the example, FIG. 3A represents user input information 302 and context awareness information 304 of an electronic device that is experiencing a processing error. FIGS. 3B and 3C represent network user input information 306 and network context awareness information 308 that is obtained from other electronic devices. In one example the other electronic devices and the user electronic device can communicate to one another via a network. FIG. 3D meanwhile represents an error reproduction plan 310 formed using the methods and processes herein. As illustrated, individual inputs, or steps, from the original user input information are eliminated, or reduced, along with irrelevant context awareness information in forming the error reproduction plan 310. In this manner a more relevant and accurate error reproduction plan 310 is formed.

In FIG. 3A the user input information inputs 312A-I include entering a name in an ID field at step 312A, and entering an entry in a password field at step 312B. In one example, when a password, login, private information, or the like is part of the input, a repair application can mask such information and only provide the action that occurred. In this manner, a repair person is not provided with personal information of the user. At step 312C a profile tab is clicked, at step 312D profile information is provided, and at step 312E the profile information is saved. Then at step 312F a classroom tab is actuated, and step 312G the live class button is actuated, at step 312H the share screen button is clicked, causing the error at step 312I to occur. In addition, the repair application obtains context awareness information 304 including the name of the user, the version of Google Chrome being utilized, the number of users on the network, and the date and time the error occurs.

While only nine inputs or steps are illustrated in FIG. 3A and four pieces of context awareness information, this is for illustration purposes only. In implementation, the number of inputs in the user input information could be tens, if not hundreds on inputs. Similarly, with regard to context awareness information, there could be ten, twenty, or more pieces of information obtained for analysis.

In FIGS. 3B and 3C inputs 314A-M and 316A-I are illustrated respectfully. In particular in FIG. 3B the inputs illustrated include entering a name of a user at step 314A, and entering the password at step 314B. Then at step 314C a password change is requested, at step 314D a new password is provided, and at step 314E the change button is clicked. At step 314F a profile tab is actuated, and profile information is input and saved at steps 314G and 314H respectfully. Then at step 314I a classroom tab is clicked, at step 314J a topic field is provided, at step 314K the live class button is actuated, at step 314K the share screen button is clicked resulting in the error message at step 314M. In this example, the context awareness information includes the user name, the Google Chrome version, the number of active users, and the date and time of the error. FIG. 3C meanwhile shows user input information and context awareness information for yet another electronic device having the same processing error as the electronic devices of FIGS. 3A and 3B. In this example, at step 316A the name is entered along with a password at step 316B. At step 316C a password is changed, at step 316D a password is entered, and at step 316E the password is changed. Then at step 316F the classroom tab is clicked, at step 316G the live class button is clicked, and at step 316H and share screen button is actuated resulting in the error at step 316I. Also, again, the context awareness data presents the user, a version of Firefox being utilized, the number of users, and date and time of the error. As indicated, while FIGS. 3A-3D only illustrate two instances of obtaining network user input information and network context awareness information, one will appreciate that hundreds of other electronic devices having the error could be in the network and utilized in analyzing information.

FIG. 3D illustrates the error reproduction plan 310 formed as a result of the analysis. Here, the steps of the error reproduction plan include entering a user name at step 318A and a password at step 318B. Then at step 318C the classroom tab is clicked, at step 318D the live class button is clicked, at step 318E the share screen button is actuated, resulting in the error at step 318F. In addition, the error reproduction plan includes that according to the context awareness information at least 25 users are required to be on the system, while the browser and time of day have not consequence on the error. Thus, by providing the analysis, instead of having to determine what caused the error with eight user input variables, and four context awareness variables, only five user input variables and one context awareness variable needs to be accounted for as a potential reason for the error. Such an error reproduction plan greatly reduces the potential variables and causes for diagnosing and fixing an error.

When hundreds of steps and dozens of context awareness variables exist, such a reduction of the variables can cause a diagnosis that is nearly impossible to determine, to be manageable for the person responsible for repairing the system. An algorithm may analyze hundreds, if not thousands or more input in order to reduce the number of inputs of the user input information. To this end, such analysis in an example could reduce the number of inputs from a hundred or more, to five to ten inputs provided in the error reproduction plan. Such reduction greatly facilitates the determination of how an underlying error has occurred, and even if possible, would take too long for a human to determine on their own to provide a repair in a timely manner. In all, such a determination could not possibly be accomplished in real time.

Figure 4:
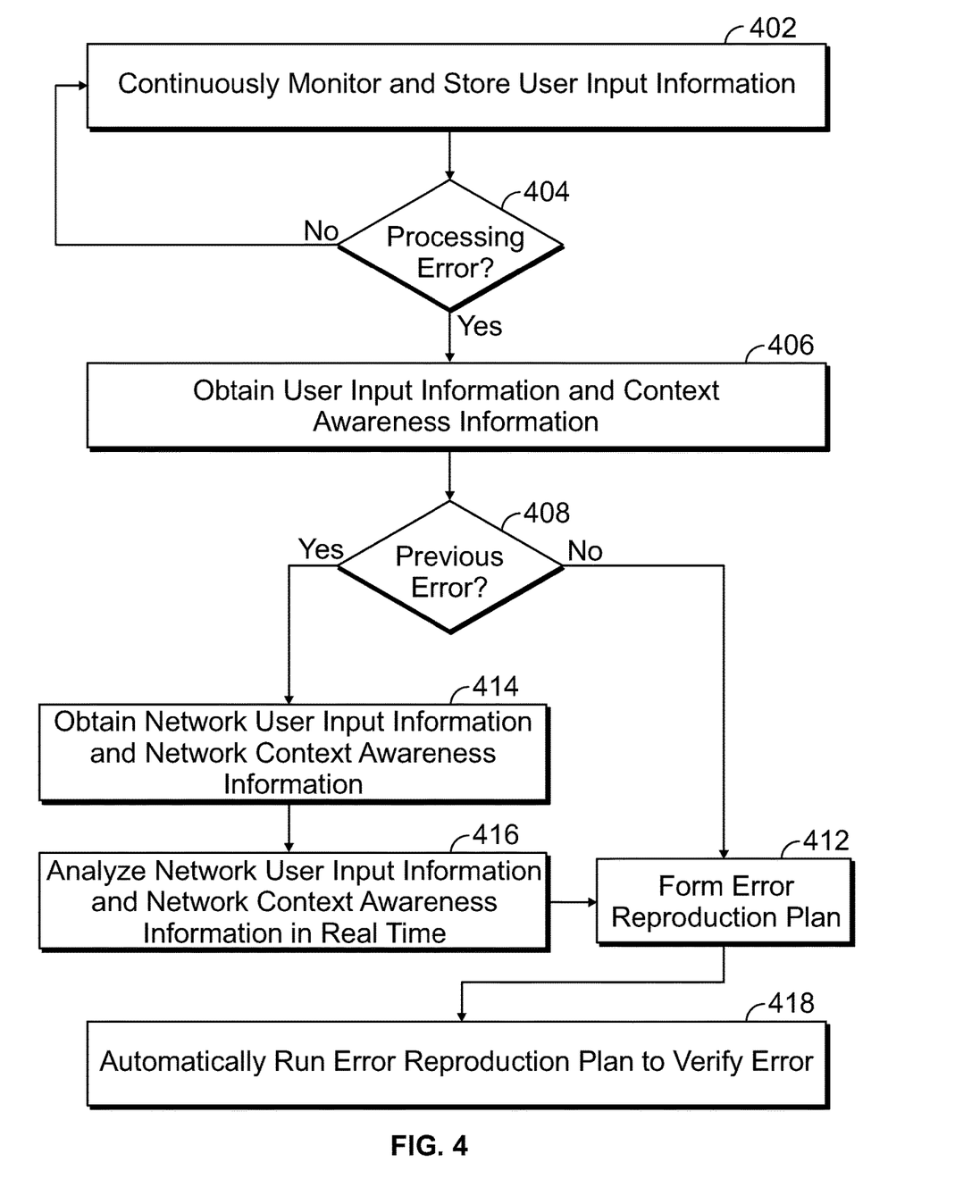
FIG. 4 illustrates a schematic block diagram of providing an error reproduction plan for an electronic device in accordance with embodiments herein.

FIG. 4 illustrates a process 400 for providing an error reproduction plan. In one example, the systems of FIGS. 1-2 are utilized to perform the process.

At 402, one or more processors continuously monitor and store user input information. User input information is any and all actuations of an electronic device. Such actuations include clicking on a button, opening a program, entering text into a text box, pressing an "enter" button, sending a message, including through electronic mail, launching an application, closing an application, starting a feature of an application, ending a feature of an application, keystrokes, changing profile information, changing password information, or the like. Each actuation may be monitored, detected, saved, stored, etc. that provides a record of actions a user is undertaking with the electronic device.

At 404, the one or more processors determine whether a processing error has occurred. A processing error occurs when and electronic device, program, application, or the like does not perform or implement the action input or requested. As an example, if a user actuates a button to open an application, and the application does not open, an error has occurred. In another example, a program can shut down, or freeze during use. Information requested to be displayed may not display, may display in an incorrect language, etc. In some examples, an error message appears on the electronic device when such a processing error occurs, while alternatively, in other examples no message appears. If at 404 no errors are identified, the one or more processors continue to monitor for a processing error.

If at 404 an error is identified, then at 406, the one or more processors obtain user input information for a determined period before the processing error, and obtain context awareness information related to the processing error. The determined period can be a period with relation to a set amount of time, such as five minutes, ten minutes, etc., or a period between the error and an event such as turning on or accessing the electronic device. In each instance a determined period is provided. In particular, all of the inputs, or steps undertaken during the determined period are determined and obtained. In addition, context awareness information such as the number of users on a network, the time of the error, operating system information, application information, program information, electronic device information, other applications in use information, or the like is also obtained.

At 408, the one or more processors determine if the processing error has previously occurred in another electronic device on the network of the electronic device. In particular, if the error that has occurred is a common occurrence, network user input information and network context awareness information related to the other occurrences can be utilized to form an error reproduction plan that eliminates steps that are not responsible for the error occurring. In one example, the error can be that share functions of a web communication application does not allow the sharing. In another example, an application may fail to launch when actuated. In yet another example, an application may automatically close at an undesired time. In particular, each event that results in an error being reported can be cataloged, recorded, stored, etc. by a repair application so that a determination can be made when the error reoccurs. In one example, the processing error may be included in a lookup table that includes the processing error, and the accompanying input information and context awareness information associated with the processing error for each instance the processing error has occurred and been reported to the repair application.

If at 408 a determination is made that the processing error has not previously occurred, then at 412 the one or more processors form an error reproduction plan. Because the error is the first of its kind, the error reproduction plan is based on the input information and context awareness information obtained related to the processing error. While this unfortunately does not simplify the current reproduction of the processing error, the input information and context awareness information are stored by the repair application for use if the processing error repeats, or occurs at another electronic device utilizing the repair application.

If at 408 a determination is made that the processing error has previously occurred and/or such information is stored by the repair application, at 414 the one or more processors obtain network user input information and network context awareness information related to the processing error from other electronic devices within a network. Because the repair application is in communication with numerous electronic devices across a network, the same processing error may occur hundreds, thousands, etc. times across all electronic devices, where the one or more processors can obtain each of those instances in real time for analysis. This is a process an individual would simply be unable to perform in any timely manner.

At 416, the one or more processors then analyze the user input information and context awareness information as compared to the network user input information and network context awareness information in real time to determine common steps, actions, actuations, inputs, etc. for each instance of the processing error. In this manner, steps, actions, actuations, inputs, etc. that are not common among the user input information and context awareness information and the network user input information and network awareness information can be eliminated from the user input information and context awareness information obtained in real time. In particular, the one or more processors can filter through hundreds, thousands, etc. of processing errors in real time to identify the common steps, actions, actuations, inputs, etc. that where undertaken that are related to the processing error. As an example, if the user input information shows steps of logging onto a computer, opening a first application, inputting information into the first application, opening a second application, opening a third application, and opening a feature in the third application resulting in the error, and the network user input of another user shows logging onto a computer, opening the first application, opening the third application, and opening the feature of the third application resulting in the error, the steps of inputting information into the first application and opening the second application can be eliminated. To this end, if one hundred previous errors all show logging in, opening the first application, opening the third application, and opening the feature in the third application, the individual attempting to repair the error can diagnosis that error results in some interaction between the first application and third application. In addition, the repair application can include instructions to indicate the certainty of the least number of steps in recreating the error, display information related to the number of common errors reviewed, or the like to provide additional information in real time to the individual attempting to diagnose the cause of the error.

At 412, the one or more processors form the error reproduction plan based on the network user input information and network context awareness information. In particular, based on the analysis of the network user input information and network context awareness information compared to the user input information and the context awareness information the error reproduction plan is formed. By eliminating steps, actions, inputs, etc. that are not common to the processing error, the error reproduction plan reduces the number of steps, actions, inputs, or the like required to reproduce the error for the individual attempting to repair the processing error. In addition, common context awareness information is also determined and provided as part of the error reproduction plan. In some examples the error reproduction plan can include information related to the certainty that irrelevant steps, actions, inputs, or the like are not provided can be part of the error reproduction plan. In this manner an individual repairing the processing error knows if this is the first iteration of the error and no additional analysis of previous error was undertaken (e.g. going from 408 to 412) or if analysis has occurred (e.g. going from 416 to 412), in addition to the amount of analysis that has occurred.

At 418, the one or more processors automatically run the error reproduction plan to verify the processing error occurs, and communicate a result of the error reproduction plan with the error reproduction plan. In one example, once the error reproduction plan is formed, the one or more processors provide the steps, actions, inputs, along with the common context awareness conditions to cause the processing error to occur. Such running of the error reproduction plan can be recorded, along with results of implementing the plan and then included as part of the error reproduction plan. In an example, the recording formed in the same file as the error reproduction plan, while in another example, a separate file that accompanies the error reproduction plan is provided.

The one or more processors can then communicate the error reproduction plan to a user or third party. After forming the error reproduction plan, the error reproduction plan can be automatically communicated to a user, third party responsible for correcting the error, etc. In examples, the communication can be an electronic mail, text message, etc. that indicates the error has occurred, what error has occurred, and includes an attached file with the error reproduction plan that can be implemented to recreate the processing error. In one example, the attached file includes the results of the repair application automatically running the error reproduction plan. In this manner, before the individual even begins attempting to solve the cause of an error, they have a reduced list of steps, inputs, actions, or the like along with context awareness commonalities related to the processing error. As a result, analysis and diagnosis of the processing error is facilitated.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a data storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
   under control of one or more processors configured with executable instructions;
   identifying a processing error;
   obtaining user input information for a determined period prior to identifying the processing error;
   determining steps undertaken during the determined period prior to identifying the processing error based on the user input information;
   obtaining context awareness information related to the one or more processors;
   obtaining network user input information and network context awareness information related to the processing error from other electronic devices within a network;
   determining a reduced number of steps from the steps undertaken during the determined period to identify the processing error to form an error reproduction plan by analyzing the network user input information and the network context awareness information in comparison to the user input information and context awareness information;
   communicating the error reproduction plan to a user or third party; and
   automatically running the error reproduction plan to verify the processing error occurs, and communicating a result of the error reproduction plan with the error reproduction plan.

2. The method of claim 1, wherein automatically running the error reproduction plan includes implementing each of the steps remaining after reducing the amount of steps.

3. The method of claim 1, wherein determining the reduced amount of steps includes utilizing a machine learning algorithm to compare the user input information to the network user input information to determine common user input information, and utilizing the machine learning algorithm to compare the context awareness information and the network context awareness information to determine common context awareness information; and wherein the error reproduction plan is based on the common user input information and common context awareness information.

4. The method of claim 1, wherein the user input information includes at least one of a keystroke, or an input device actuation.

5. The method of claim 1, wherein the context awareness information includes at least one of number of users on the network, time the processing error is identified, operating system information, or number of programs the user is operating.

6. The method of claim 1, further comprising, continuously monitoring the user input information, and storing the user input information.

7. The method of claim 1, wherein obtaining network user input information and network context awareness information related to the processing error from other electronic devices within the network includes accessing a storage device within the network.

8. The method of claim 1, wherein communicating the error reproduction plan to a user includes displaying the error production plan on an output device.

9. The method of claim 1, wherein communicating the error reproduction plan to a user includes attaching a file that includes the error reproduction plan to a communication to the user or the third party.

10. A device, comprising:
one or more processors;
a memory storing program instructions accessible by the processor, wherein, responsive to execution of the program instructions, the processor performs the following:
identifies a processing error;
obtains user input information for a determined period prior to identifying the processing error;
determines steps undertaken during the determined period prior to identifying the processing error based on the input information;
obtains context awareness information related to the one or more processors;
obtains network user input information and network context awareness information related to the processing error from other electronic devices within a network;
determines a reduced number of steps from the steps undertaken during the determined period to identify the processing error to form an error reproduction plan by analyzing the network user input information and the network context awareness information in comparison to the user input information and context awareness information; and
communicates the error reproduction plan to a user or third party; and
a sensor configured to obtain the context awareness information in real time.

11. The device of claim 10, wherein the context awareness information includes identification of an operating system, identification of a number of users on a network in communication with an electronic device that has the processing error, and a time of the processing error.

12. The device of claim 10, wherein the processor further performs the following:
automatically runs the error reproduction plan to verify the processing error occurs, and communicates a result of the error reproduction plan with the error reproduction plan.

13. The device of claim 12, wherein automatically running the error reproduction plan includes implementing each of the steps remaining after reducing the amount of steps.

14. The device of claim 10, wherein determining the reduced amount of steps includes utilizing a machine learning algorithm to compare the user input information to the network user input information to determine common user input information, and utilizing the machine learning algorithm to compare the context awareness information and the network context awareness information to determine common context awareness information; and wherein the error reproduction plan is based on the common user input information and common context awareness information.

15. The device of claim 10, wherein the processor further performs the following:
continuously monitoring the user input information, and storing the user input information.

16. The device of claim 10, wherein obtaining network user input information and network context awareness information related to the processing error from other electronic devices within the network includes accessing a storage device within the network.

17. A computer program product comprising a non transitory computer readable storage medium comprising computer executable code, wherein one or more processors are configured to execute the computer executable code to:
identify a processing error;
obtain user input information for a determined period prior to identifying the processing error;
determine steps undertaken during the determined period prior to identifying the processing error based on the input information;
obtain context awareness information related to the one or more processors;
obtain network user input information and network context awareness information related to the processing error from other electronic devices within a network;
determine a reduced number of steps from the steps undertaken during the determined period to identify the processing error to form an error reproduction plan by analyzing the network user input information and the network context awareness information in comparison to the user input information and context awareness information;
communicate the error reproduction plan to a user or third party; and
automatically run the error reproduction plan to verify the processing error occurs, and communicating a result of the error reproduction plan with the error reproduction plan.

* * * * *